No. 887,466.

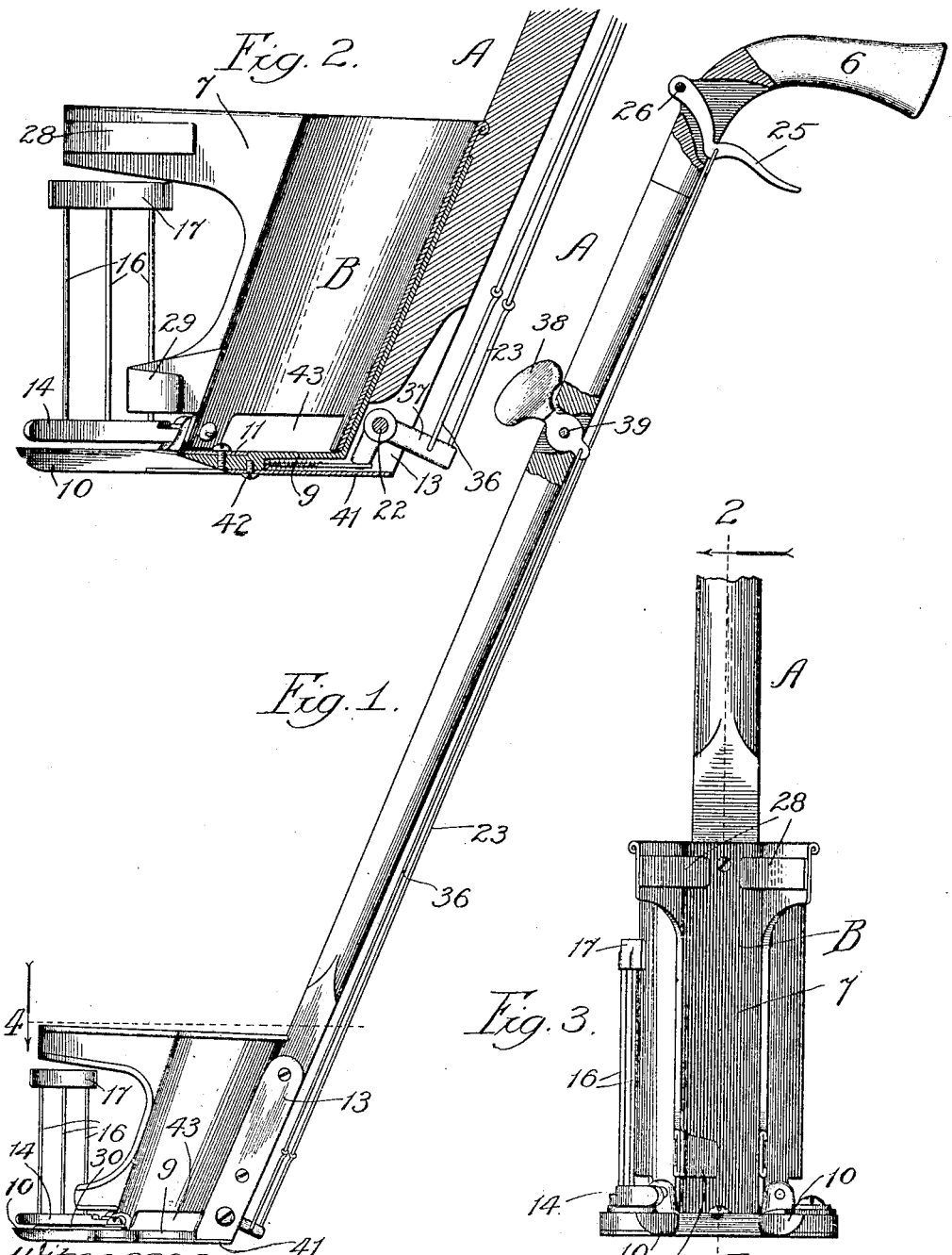

PATENTED MAY 12, 1908.

C. F. DAVIS.
ASPARAGUS CUTTER.
APPLICATION FILED JUNE 24, 1907.

2 SHEETS—SHEET 2.

Witnesses
John Enders
Chas. H. Buell

Inventor:
C. F. Davis,
By L. B. Coupland,
Atty.

UNITED STATES PATENT OFFICE.

CHARLES F. DAVIS, OF DOWNERS GROVE, ILLINOIS.

ASPARAGUS-CUTTER.

No. 887,466.   Specification of Letters Patent.   Patented May 12, 1908.

Application filed June 24, 1907. Serial No. 380,526.

*To all whom it may concern:*

Be it known that I, CHARLES F. DAVIS, citizen of the United States, residing at Downers Grove, in the county of Dupage and State of Illinois, have invented certain new and useful Improvements in Asparagus-Cutters, of which the following is a specification.

This invention relates to a vegetable harvesting implement more especially intended for cutting asparagus; and has for its object to provide a device of this character that will greatly facilitate the operation as will be hereinafter set forth.

Figure 4:
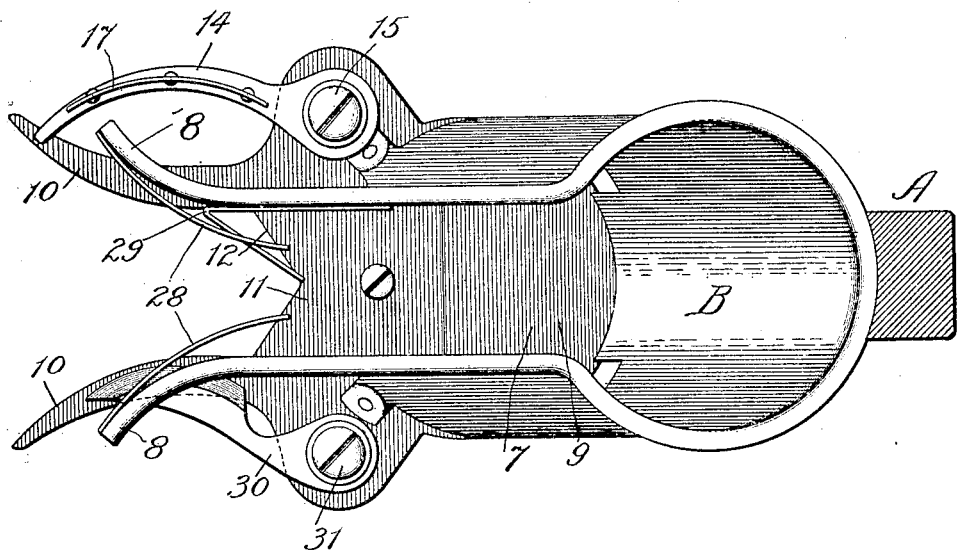
Figure 5:
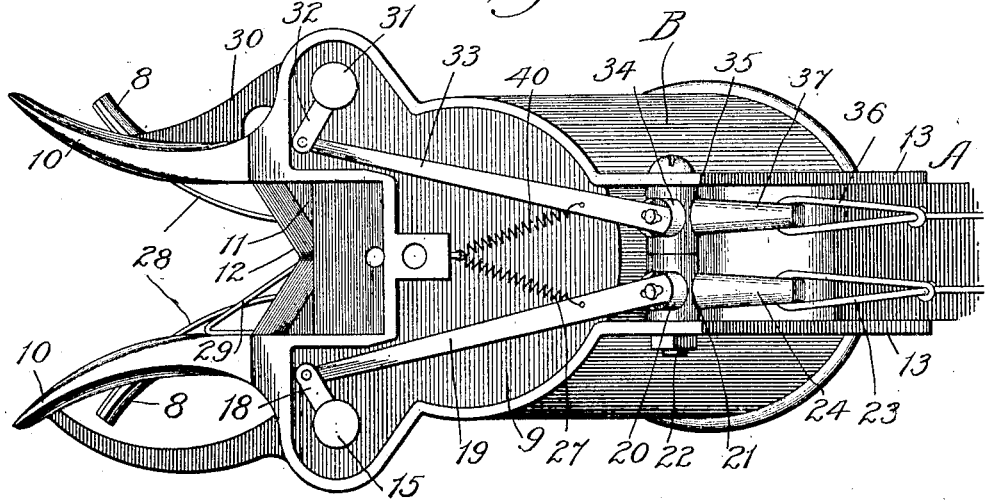

In the drawings, Figure 1 is a side elevation of a device embodying the improved features. Fig. 2 is a vertical section on line 2, Fig. 3, looking in the direction indicated by the arrow. Fig. 3 is a front elevation. Fig. 4 is a horizontal plan on line 4, Fig. 1;
and Fig. 5 is a bottom plan, the cap-plate being removed.

A represents a handle which will be of a suitable length and has the upper end bent around to form the convenient hand-grasp 6, as shown in Fig. 1. A cylindrical holder B is rigidly secured to the lower front part of the handle and is open on the outer front side as best shown in Figs. 2 and 4. This holder is provided on each side of the longitudinal opening 7 with companion guides 8 which extend outward from the upper part and have an outward curve, as best shown in Fig. 4. The lower end of the holder is closed by a base-plate 9 that is in turn provided with companion guide-fingers 10 which curve outward at the ends. The purpose of these guides is to form jaws that pass on each side of the stalk or other object and guide the same into the throat leading into the holder and in position to be brought in contact with the stationary cutter blade 11 provided with a beveled V-shaped cutting edge 12 having a shearing cut. The base-plate 9 is provided with the inclined extension plate 13 rigidly secured to the opposite sides of the handle, as best shown in Fig. 5.

A swinging arm 14 is located at one side of the opening into the holder. The outer end of this arm is free, the inner end being secured to the base-plate 9 by a pivot-pin 15. The arm 14 and pivot-pin are rigidly fastened together, the latter extending through and is free to turn in the base-plate in practical working. The arm 14 curves inward (Fig.
4) and has the lower ends of a number of bars 16 fixed therein and spaced apart. A curved plate 17 with the concave side inward, is secured to the upper ends of the bars 16 and connects the same in their spaced position as best shown in Figs. 1, 2 and 4. This arrangement forms a cradle to be brought in contact with the stalks and prevent the same from falling outward in the operation of cutting. In practical working the arm 14 swings around in contact with the stalks and forces the same against the stationary cutter-blade 11, the bars of the cradle carrying the stalks inward into the holder as they are severed.

One end of a link 18 (Fig. 5) is connected to the lower end of pin 15 and the other end to the joining end of a lever 19, the other end of which is in turn connected to the arm 20 of a bell-crank 21 having a rocking movement on a pivot-bolt 22. A wire 23 connects the arm 24 of the bell-crank 21 and an actuating trigger 25 located in the handle near the upper end, as shown in Fig. 1. This trigger is pivoted as at 26, the free end extending into position to be conveniently manipulated with the same hand grasping the upper end of the handle. By pulling the free end of the trigger upward the arm 14 is swung inward against the stalk for the purpose before described. When the cutting pressure on the trigger is relaxed the arm 14 and cradle part are returned to normal by a spring 27, shown in Fig. 5. One end of the companion spring retaining fingers 28 are secured to the inside upper ends of the holder (Fig. 3) the free ends extending diagonally into the throat passage of the holder. A third finger 29 is located in the lower part of the holder the free spring end extending into the throat space. These fingers yield to the pressure of the stalks as they are forced into the holder, but prevent the same from tilting outward.

An auxiliary movable cutting blade 30 is provided, and has its inner end rigidly secured to a pivot-pin 31 (Figs. 4 and 5) which has a turning movement in the base-plate 9. One end of a link 32 is secured to the lower end of the pin 31, the other end being fastened to the joining end of a lever 33, the opposite end of which is in turn secured to the arm 34 of a bell-crank 35 having a rocking movement on the pivot-bolt 22. A wire 36 connects the bell-crank arm 37 and a hand-grasp 38 pivoted as at 39 in the handle and located in a balancing position, as both hands are employed in manipulating the device. By pushing downward on the hand grasp 38 the blade 39 is swung inward into a cutting position, the parts being returned to normal after each cutting movement by means of a spring 40. This auxiliary cutter is not for general use, but is more especially intended to be used when the work is heavy and for cutting off the woody tough butts in clearing the ground after the tender marketable parts of the stalks have been harvested.

The working parts located under the base-plate 9 are protected and the dirt excluded therefrom by a removable bottom-plate 41 held in place by a screw 42.

The openings 43 provide for the escape of any loose earth that may be carried into the holder on the stalks.

It will be understood that the capacity of the holder will be equal to a marketable bunch of asparagus and is removed therefrom in that form.

Having thus described my invention, what I claim is—

1. A device of the kind described, comprising a holder consisting of a hollow cylindrical body having an opening thereinto which extends from end to end, a handle to which said holder is secured, a stationary cutter-blade located in the passage to or across said opening, and means for bringing an object to be severed in contact with said cutter.

2. A device of the kind described, comprising a handle, a holder or receptacle mounted on one end thereof and having an opening in the front side, a cutting blade, and means for forcing the object to be cut against said cutter and moving the same into said holder.

3. A device of the kind described, a handle, a holder rigidly secured to one end thereof and having a longitudinal opening therein, guides extending outward on either side of said opening, a stationary cutter positioned to sever an object entering between said guides, and means for bringing an object in contact with said cutter and depositing the same in said holder.

4. In a device of the kind described, a handle, a cylindrical holder having an opening in one side thereof and mounted on the lower end of said handle, a stationary cutting-blade located in the passage to said opening, an arm free at one end and having a swinging movement across said passage in forcing the stalks against said cutting-blade and carrying them into said holder when they are severed, means for manually imparting an operative movement to said arm, and means for automatically returning the same to its normal position.

5. In a device of the kind described, a handle, a holder having an opening at one side, a cutter-blade located in the passage to said opening, an arm combining a cradle feature therewith and adapted to be moved across said passage, a manipulating trigger and the operative connection between said arm and trigger.

6. In a device of the class described, a supporting handle, a holder rigidly secured thereto and consisting of a hollow cylindrical body having an opening along one side thereof, a stationary cutter located at the base of said holder in the passage to or across said opening, an auxiliary cutting blade capable of a swinging movement across the path leading into said holder, an actuating hand-grasp, and the operative connection between said auxiliary blade and hand-grasp.

In testimony whereof I affix my signature, in presence of two witnesses.

CHARLES F. DAVIS.

Witnesses:
L. B. COUPLAND,
G. E. CHURCH.